United States Patent [19]

Bounds

[11] 4,383,521
[45] May 17, 1983

[54] FOUNDATION-BASED SOLAR HEATING SYSTEM

[76] Inventor: Edward G. Bounds, 1209 Frederick Ave., Salisbury, Md. 21801

[21] Appl. No.: 325,839

[22] Filed: Nov. 30, 1981

[51] Int. Cl.³ .......................... F24J 3/02; E02D 27/00
[52] U.S. Cl. ...................................... 126/430; 52/294; 126/431; 126/436
[58] Field of Search ............... 126/427, 430, 431, 436, 126/435, 428; 52/293, 294

[56] References Cited

U.S. PATENT DOCUMENTS

| | | | |
|---|---|---|---|
| 3,369,541 | 2/1968 | Thomason | 126/430 |
| 4,029,258 | 6/1977 | Groth | 126/430 |
| 4,210,201 | 7/1980 | D'Hanlon | 126/436 |
| 4,295,415 | 10/1981 | Schneider | 126/428 |

*Primary Examiner*—Samuel Scott
*Assistant Examiner*—G. Anderson

*Attorney, Agent, or Firm*—Francis B. Francois; Francis D. Thomas, Jr.

[57] ABSTRACT

The foundation-based solar heating system includes a plurality of preformed beams that define a perimeter, the beams being elevated above the earth and receiving a building thereon. The building floor, the beams, and the earth enclosed by the beams define a plenum chamber, and the beams have internal air flow channels therein. One of the beams is south-facing, and carries solar collector means thereon that is connected with the flow channels. Return ducts connect the flow channels on the opposite side of the foundation perimeter to the south-facing beam, and to the solar collector means. The beams are externally insulated, and air flowing through the system heats the plenum chamber and provides a heat source for the building. An air circulating unit assures a flow of circulating air from the plenum chamber through the building, and includes an auxiliary heating element means.

9 Claims, 6 Drawing Figures

U.S. Patent  May 17, 1983  Sheet 1 of 3  4,383,521
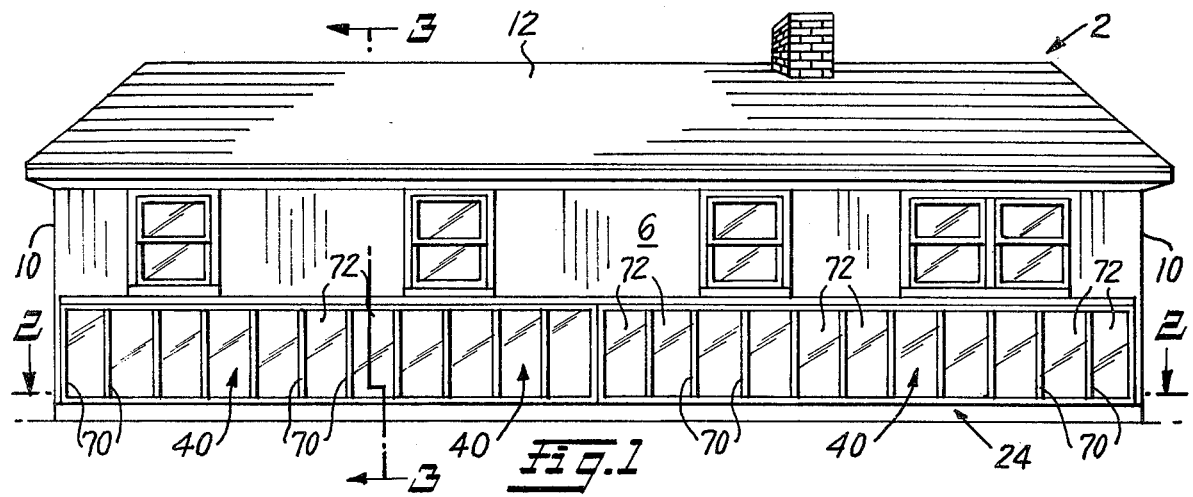
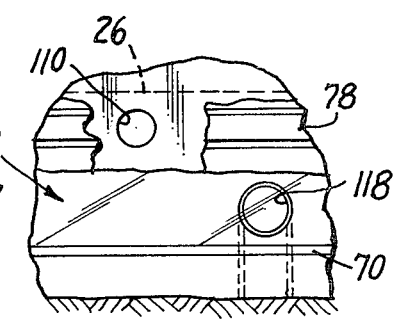
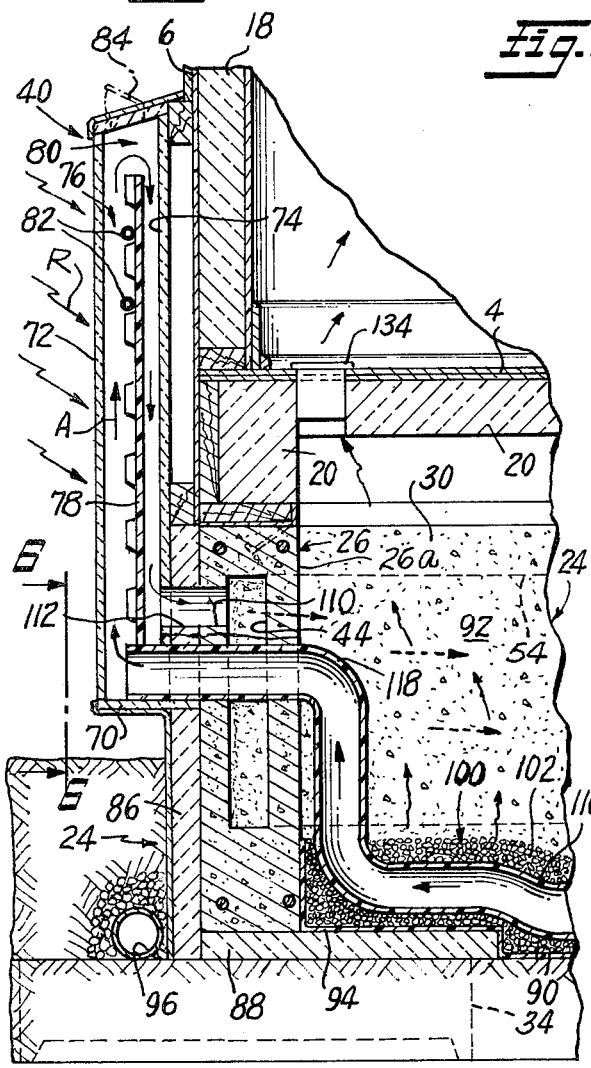
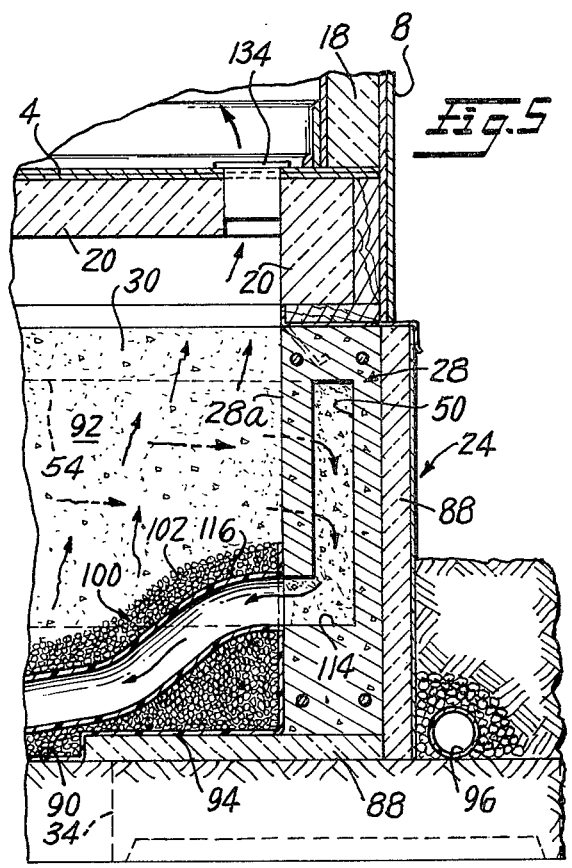

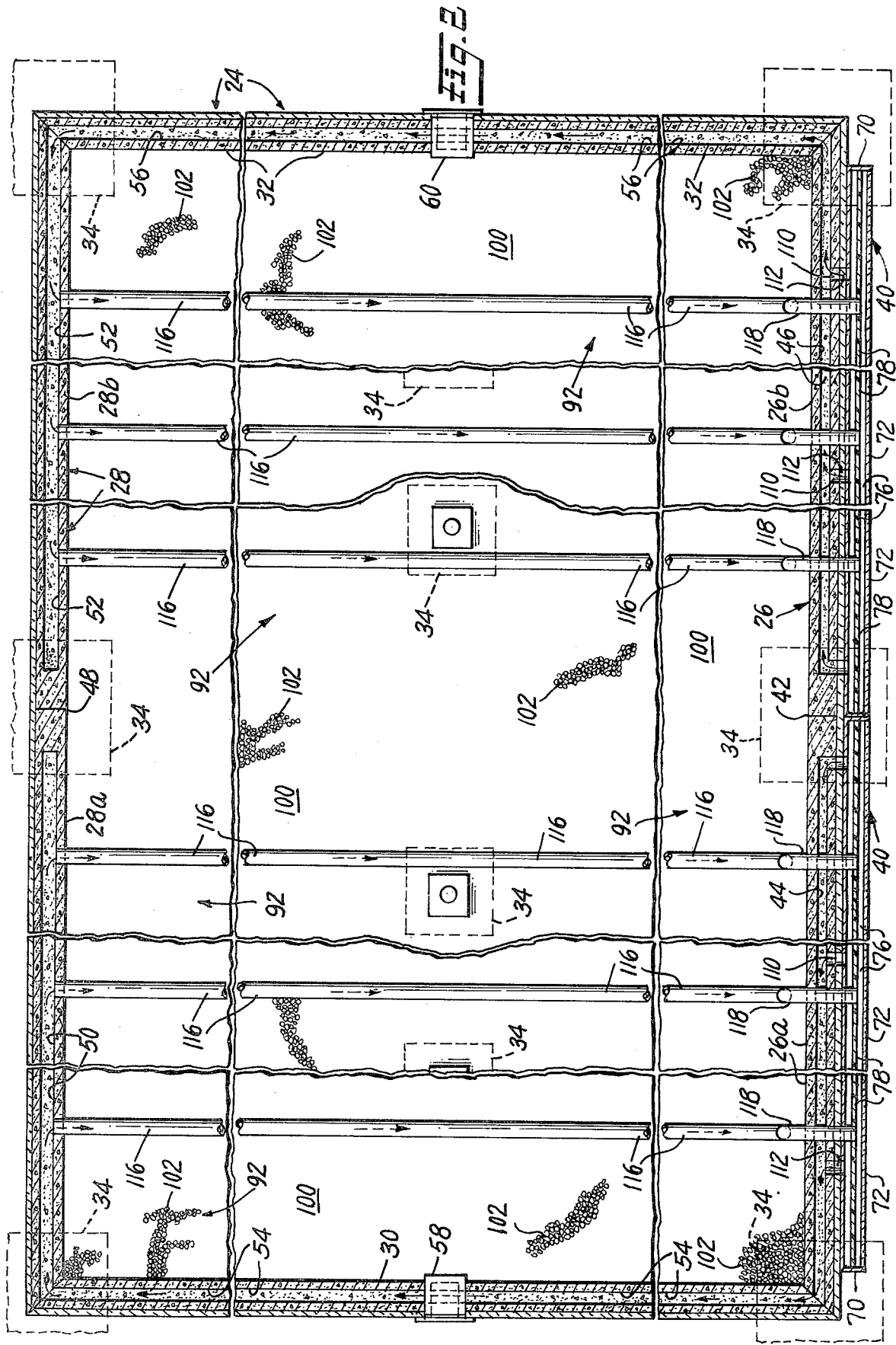

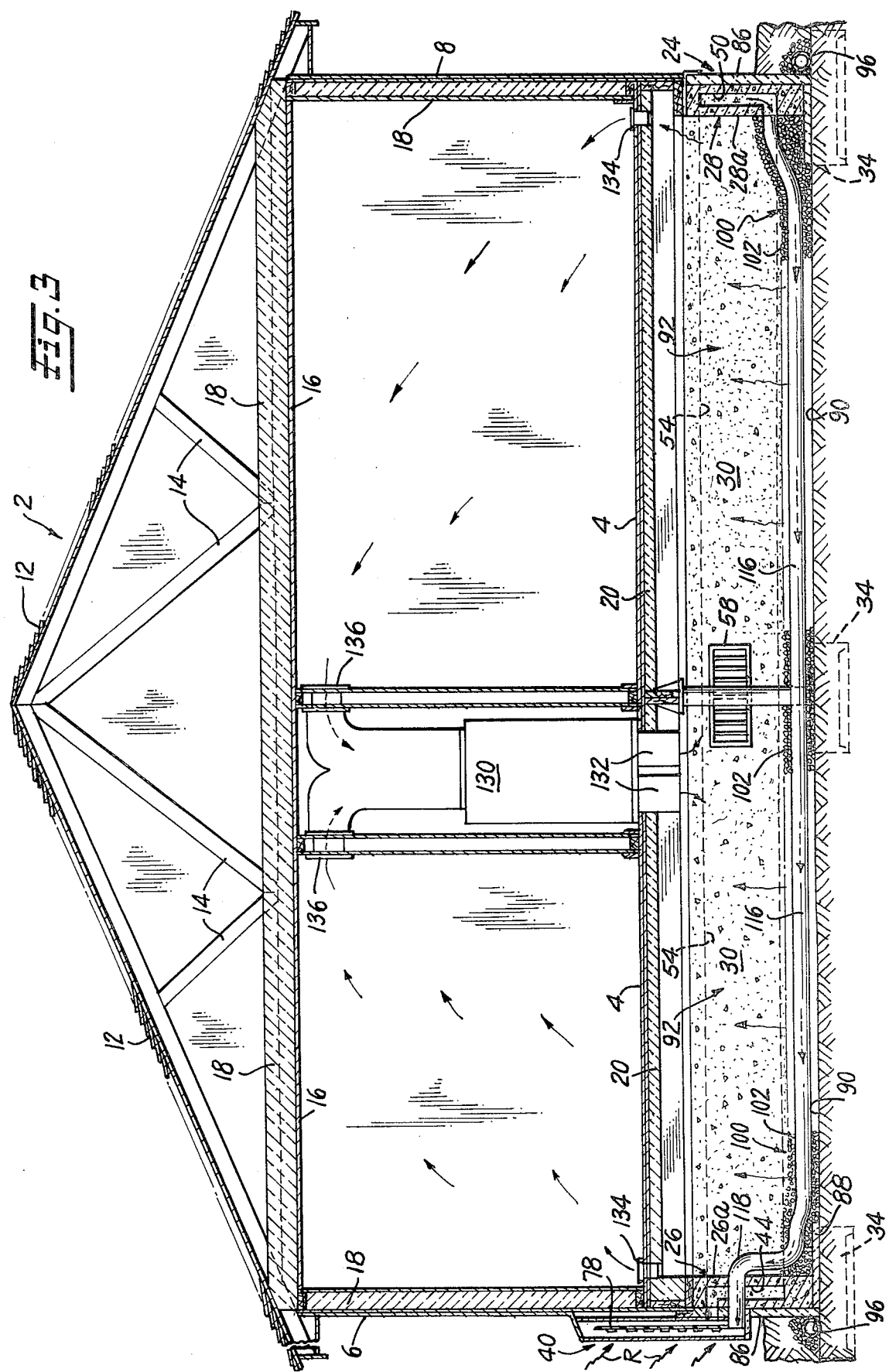

FOUNDATION-BASED SOLAR HEATING SYSTEM

TECHNICAL FIELD OF THE INVENTION

This invention relates generally to solar heating systems for buildings, and more particularly, to an improved solar heating system based on a uniquely constructed building foundation arrangement.

BACKGROUND OF THE INVENTION

There have been many solar heating arrangements devised to utilize the sun as an energy source for heating residential dwellings and other buildings. Usually, these arrangements employ solar collector apparatus which is mounted on the roof, or on some other structural element of the building such as a specially constructed sidewall. While solar heating systems of this type are often effective they require special construction techniques for the building, and thus usually preclude the use of conventional building designs, and in particular the use of commonly available manufactured housing units and preformed commercial buildings. Thus, the use of such known solar heating systems tends to significantly increase the overall building construction cost and sale price, because of the need for specialized designs and expensive installation work.

A new concept in solar heating equipment for buildings is disclosed in the present inventor's issued U.S. Pat. No. 4,275,538. That patent describes a new foundation method and arrangement for building erection, utilizing preformed, precast concrete beams supported in a unique manner upon the earth, and which greatly reduces the time and expense of foundation construction. Further, the patent discloses how solar energy collecting means can be combined with the new preformed beam foundation system, to allow heating of buildings mounted on the foundation with solar energy without requiring the usual extensive modifications to the building itself.

More particularly, the patent teaches the installation of solar collector equipment on one of the performed beams, so that it does not need to be installed on the building. At least one of the preformed beams is made of concrete and acts as a heat sink, and the solar collector equipment is arranged to utilize the heat sink characteristics of this beam. Means is then provided to transmit heat from the solar collector equipment and the concrete beam to the building, which in a preferred form of the invention described in the patent comprises ducts leading directly from the preformed concrete beam and the solar collector to the building interior, and suitable return ducts for the cold air.

While the arrangement shown and described in the noted issued patent is effective, it has now been found that the solar heating system can be made much more effective by utilization of a unique arrangement for handling air flow between the solar collector apparatus and the building interior. That unique arrangement is the subject of this invention, and constitues a significant improvement over the invention as shown and described in U.S. Pat. No. 4,275,538.

BRIEF SUMMARY OF THE INVENTION

The present invention is based on the unique foundation arrangement disclosed in U.S. Pat. No. 4,275,538, wherein preformed foundation beams are supported from the ground and assembled to form a foundation perimeter. In the present invention, the preformed beams of the foundation perimeter contain internal warm air channels, leading from a main, south-facing beam upon which solar collector apparatus is mounted around the foundation perimeter to the opposite side thereof. The foundation beams cooperate with the floor of a building erected thereon and with the earth enclosed by the beam perimeter to form a plenum chamber that underlies the building. The warm air channels in the preformed foundation beams lead to the beam on the shade or north side of the building, where they are connected with a plurality of air return ducts that extend transversely across the plenum chamber from the north-facing beam to the main, south-facing beam. At the main beam, the air return ducts are connected to return channels which in turn are in communication with the solar collector apparatus.

In the invention, then, the solar collector apparatus functions to collect solar energy, which is distributed by air moving through the warm air channels interiorly of the beams. The warm air flows around the perimeter of the foundation to the north-facing beam, and then through the plenum chamber via the air return ducts back to the south-facing beam and the solar collector apparatus. The result is that the whole plenum chamber is heated, providing a warm floor for the building mounted on the foundation and a reserve of warmed air for passing into the building.

The precast beams are preferably formed of concrete, so as to provide an effective heat sink for storing heat during periods of intense sunlight. Further, the plenum chamber contains a heat storage bed of rocks, placed over the air return ducts so that the air passing through the return ducts serves to heat the rock storage bed. The rock bed acts as a further heat sink and stores heat, which is then passed into the plenum chamber and is radiated against the building floor.

Finally, to assure proper air flow from the plenum chamber to the building interior and return, a conventional heating and air circulating unit of the heat pump or other suitable type is mounted within the building. The heating and air circulating unit is in communication with the plenum chamber, and circulates air from the chamber, through the building, and then back to the chamber. Should the outside temperature drop to unusually low levels or prolonged periods without sunshine be encountered, the heater portion of the heating and air circulating unit is employed to provide auxiliary heating to the building.

One of the significant advantages of the present invention is that it provides all the advantages of a solar energy system, without requiring other than minor modifications to the building structure. In particular, the invention is especially adapted for use with so-called manufactured housing units, and with prefabricated commercial buildings. In addition, the invention provides for a heated building floor, which in turn provides radiant heat to the building interior.

It is a principle object of the present invention to provide an improved solar heating system, designed to provide solar heat to a building without requiring extensive structural modification thereof.

Another object is to provide a foundation-based solar heating arrangement, designed to heat the floor of a building erected upon the foundation.

Yet another object is to provide a solar heating system designed to take maximum advantage of the unique foundation system described in U.S. Pat. No. 4,275,538.

It is also an object of the invention to provide a solar heating system that is easy to construct, inexpensive, and economical in operation.

Other objects and many of the attendant advantages of the invention will become readily apparent from the following Description of the Preferred Embodiment, when taken in connection with the accompanying drawings.

BRIEF DESCRIPTION OF THE DRAWINGS

FIG. 1 is a rear elevational view of a building incorporating the foundation-based solar heating system of the invention, the rear of the building facing toward the south, and the south-facing foundation beam of the foundation carrying an array of solar collector units;

FIG. 2 is a fragmentary horizontal sectional view through the foundation of the building, taken generally along the line 2—2 of FIG. 1;

FIG. 3 is a vertical sectional view through the building and the foundation, taken generally along the staggered section lin 3—3 of FIG. 1;

FIG. 4 is an enlarged, fragmentary vertical sectional view through one of the solar collector units, showing how it is arranged relative to the south-facing foundation beam and the air return ducts;

FIG. 5 is a fragmentary vertical sectional view through an area of the foundation on the north-facing side of the building; and FIG. 6 is a fragmentary elevational view, taken generally on the line 6—6 of FIG. 4, showing one of the air inlet ports and one of the air return ducts in relationship to the south-facing beam of the foundation.

DESCRIPTION OF THE PREFERRED EMBODIMENT

Referring now to the drawings, a building 2 is shown in rear elevation in FIG. 1, the building 2 in the drawings being a dwelling having a floor 4, rear and front walls 6 and 8, sidewalls 10, a roof 12 supported by rafters 14, and a ceiling 16. The walls 6, 8 and 10 all contain insulation 18 installed in the conventional manner, and the area above the ceiling 16 also contains insulation 18. Further, the area beneath the floor 4 also has insulation 20 placed thereon, the insulation all serving to slow the transfer of heat from the building 2 to the ambient surrounding air. It is to be understood that the building 2 might instead be a commercial or industrial structure.

The building 2 is mounted upon a foundation 24, which includes a rear or south-facing preformed beam 26, a front or north-facing preformed beam 28, and end beams 30 and 32, all mounted on and supported by retangular footings 34 in the same manner as disclosed in U.S. Pat. No. 4,275,538, the substance of which is incorporated herein by reference. The unique building foundation method and system of the identified patent allows the preformed beams 26, 28, 30 and 32 to be quickly placed and adjusted to the desired vertical position, after which steel plates embedded in the beams are welded to each other where the beams meet to provide a unified foundation 24.

The south-facing beam 26 has thus far been identified as the rear beam, because the building 2 of the drawings has been placed with its rear side facing toward the sun, or south. This is done to allow for the maximum number of solar collector units 40 to be mounted thereon, since if the building front faced to the sun, or south, some space would normally be lost to a front door, steps, foundation plantings, and the like. However, in some instances it may be desirable to have the front of the building face south, or toward the sun. Thus, for purposes of this description the beam 26 will hereinafter simply be called the south-facing beam, regardless of whether it is at the front or rear of the building, and the beam 28 will be called the north-facing beam. The term south-facing, for purpose of this description, means facing toward the sun.

Referring again to the drawings, the south-facing beam 26 is shown to be comprised of two sections 26a and 26b, connected at the center 42 of the beam 26 by welded plates (not shown). If desired, however, the beam 26 can also be cast integrally. In any case, the beam 26 has two warm air channels 44 and 46 cast therein, extending in opposite directions from a point near the beam center 42 to the ends of the beam. The north-facing beam 28 is similarly comprised of two sections 28a and 28b jointed at the beam center 48 by welded plates (not shown), and contains cast warm air channels 50 and 52 that extend from near the beam center 48 to the ends thereof. A cast channel 54 extending completely through the end beam 30 connects the channels 44 and 50, and a similar cast channel 56 extending completely through the other end beam 32 connects the channels 46 and 52. In order to keep air moving from the south-facing beam 26 to the north-facing beam 28, conventional low speed squirrel cage blowers 58 and 60 are installed in the end channels 54 and 56, respectively. It is to be understood that the type of blower utilized can be varied without departing from the invention, and that the blowers should be arranged and installed so they can be serviced from the exterior of the foundation 24.

The preformed beams 26, 28, 30 and 32 will usually be cast of concrete at a location remote from the building site, and will then be carried to the site for installation. The concrete beams are efficient heat sinks, as discussed in U.S. Pat. No. 4,275,538, and the two air loops formed by the internal, cast channels extending therethrough function to carry air that usually warms or is warmed by the concrete of the beams, depending upon the operational status of the system. During periods of intense sunlight, the air flowing through the cast channels is hot and functions to heat the concrete, which then functions as a heat sink to retain heat for a relatively long period of time. At night or when sunlight is absent, the air flowing through the cast channels of the two loops then functions to gather heat from the concrete of the beams.

The solar collector units 40 mounted on the south-facing beam 26 can be of any suitable construction, and typically each will include a rectangular frame 70 mounted on the beam 26 and extending upwardly on the associated building wall 6. The frames support transparent panels 72 of glass or plastic, which are spaced from a collector rear wall 74 and which together with the rear wall 74 and the frame 70 define an enclosed collector cavity 76. As shown in FIG. 2, a collector cavity 76 extends over each half of the beam 26, the frames 70 being arranged to provide this result. A collector plate 78 is mounted vertically in each cavity 76 about midway between the rear wall 74 and the panels 72 and extends nearly to the top thereof, where a flow space 80 is provided. If desired, the front face of the collector plates 78 can carry conduits 82 thereon, through which fluid can be circulated for transmitting solar energy to another location or installation, such as a solar water heater.

Typically, the collector plates 78 will be black in color to maximize their heat gathering characteristics, and will be spaced about two or four inches from the transparent panels 72. Air is circulated upwardly through the space between the plates 78 and the panels 72, as shown by the arrows A in FIG. 4, and is heated by solar rays R that pass through the panels 72 to heat the cavities 76 and strike the collector plates 78. The collector plates 78, especially when they are black in color, will usually become quite hot, and serve to further heat the flowing air. In the summer or at other times when it is desired to de-activate or reduce the warm air generating activity of the solar collector units 40, vents 84 provided in the tops of the frames 70 are opened, so that the collector cavities 76 are directly connected with the ambient outside atmosphere.

In order to retain as much heat therewithin as possible, the beams 26, 28, 30 and 32 are all insulated on the exposed surfaces thereof. More specifically, sheet insulation 86 of foam plastic or the like, say about 2 inches in thickness, is placed on the exterior of each of the beams 26, 28, 30 and 32. Further, similar insulation sheeting 88 is placed under each of the beams, between the beams and their footings 34.

The four perimeter beams 26, 28, 30 and 32 of the foundation 24, the floor 4 of the building 2, and the surface of the earth 90 of the earth enclosed by the foundation 24 define a plenum chamber 92 that underlies the entire portion of the floor 4 enclosed by the foundation 24. The surface of the earth 90 has plastic sheeting 94 (FIGS. 4 and 5) placed thereon to form a water barrier, and conventional drain pipe 96 is placed about the exterior of the foundation 24 to drain water away therefrom. Thus, the plenum chamber 92 is maintained dry. Further, because the interior walls of the four perimeter beams 26, 28, 30 and 32 do not carry insulation, they radiate heat into the plenum chamber 92.

A heat storage bed 100 is formed within the plenum chamber 92, by placing rock 102 of suitable size therein to a depth of several inches. Preferably, stones of about one inch diameter will be utilized, placed to a depth of about 8 inches. This storage bed 100 provides a further heat sink, to store heat for nighttime and periods with limited sunshine.

Returning now to the south-facing perimeter beam 26, warm air entry ports 110 are cast therein to communicate the upper ends of the channels 44 and 46 with the collector cavity 76 at a point behind and at the bottom of the collector plate 78, the insulation 86 having similar ports 112 in register with the entry posts 110. In a typical installation, the warm air entry ports 110 will measure about 4 inches in diameter, and will be spaced about eight feet apart. Each of the solar collector units 40 has an extended collector cavity 76 to serve three of the entry ports 110, as noted earlier, and in the drawings three of the entry ports 110 will supply warm air to each of the two warm air distribution loops formed by the internal warm air channel 44, 46, 50, 52, 54 and 56. The two blowers 58 and 60 will be sized to typically move the circulating air at about 150 C.F.M.

The north-facing perimeter beam 28 has a plurality of warm air discharge ports 114 therein communicating with the lower ends of the channels 50 and 52, and which fact toward the plenum chamber 92. The discharge ports 114 will normally correspond in number, spacing and diameter to the entry ports 110, with an equal number provided for each distribution loop. Connected to the discharge ports 114 and extending transversely across the plenum chamber 92 to the south-facing beam 26 are return ducts 116, preferably made of corrugated material to assure the maximum of heat radiation therefrom. Typically, the ducts 116 will be made of plastic, and they are buried in the rocks 102 comprising the heat storage bed 100 so that as warm air moves through the ducts it will heat the storage bed. A typical building will measure about 28 feet wide by 44 feet long, and assuming six return ducts 116 are utilized with the arrangement shown in the drawing, the air leaving the ducts will be relatively cool.

At the south-facing beam 26, the forward ends of the return ducts 116 are connected to discharge ducts 118 that extend through the beam 26 and empty into the bottom of the collector cavities 76 in front of the collector plates 78.

It is thus seen that the complete air cycle for each of the two loops includes passage of the air upwardly over the collector plates 78 within the collector cavities 76, through the passages 80, downwardly through the warm entry ports 110, around the periphery of the foundation 24, through the return ducts 116, and then back into the lower ends of the cavities 76 through the discharge ducts 118. The two loops are closed, and movement of the air is assured by the two blower units 58 and 60. The moving warm air heats the four beams 26, 28, 30 and 32, and this heat is in turn radiated into the plenum chamber 92. Escape of heat to the atmosphere is minimized by the insulation sheets 86 and 88.

Further, the interior of the plenum chamber 92 is heated by the warm air flowing the return ducts 116, which air also heats the storage bed 100. The result is that the plenum chamber 92 is quite warm, and provides a reservoir of heated air for heating the building 2. Because the building floor 4 overlies the plenum chamber 92, it is heated thereby and in turn acts as a radiant heat element for the interior of the building. But usually, this will not suffice to heat the building interior under all conditions, and thus a positive flow of air to and from the plenum chamber 92 is necessary.

Referring now to FIG. 3 of the drawings, a conventional heating and air circulating unit 130 is installed centrally of the building 2, and includes a pair of downwardly directed discharge ducts 132. The perimeter of the floor 4 has registers 134 therein, which communicate the plenum chamber 92 with the interior of the building. Finally, the unit 130 also includes intake or air return ducts 136, mounted on the upper end thereof. Thus, when the air circulation elements of the unit 130 are operating, the unit will be effective to discharge air into the plenum chamber 92, and to draw air in through the intake or return ducts 136. This will in turn establish an air flow pattern from the discharge ducts 132, through the plenum chamber 92, upwardly through the perimeter registers 134, through the interior of the building 2, to the intake or return ducts 136, and then through the unit 130. When additional heat is required within the building 2, such as in very cold weather or after a prolonged cloudy period, the heating element of the unit 130 (not shown) is activated to provide the same. The heating element can be of any suitable design, say a heat pump, or a conventional furnace unit.

The foundation-based solar heating system of the invention is effective to provide heat to a building under most weather conditions, so that supplemental heating will not be required. Further, as is evident from the drawings, the system is simple, easy to install, and essentially maintenance free. Finally, it can be utilized with essentially any building, especially premanufactured residential and business buildings.

Obviously, many modifications and variations of the invention are possible.

I claim:

1. A foundation-based solar heating system for use with conventional buildings, comprising in combination:
   a foundation erected upon the earth and defining an enclosed perimeter, said foundation including:
   a plurality of horizontally extending preformed concrete beams connected to each other to form said enclosed perimeter, each of said beams having top, bottom, and inner and outer side surfaces; and
   means engaged with the bottom surfaces of said preformed concrete beams for supporting said beams upon the earth, whereby the top surfaces thereof are elevated above the surface of the earth enclosed by said enclosed perimeter and are adapted to receive and support a building:
   said horizontally extending beams being arranged so that one thereof is south-facing and the beam opposite said south-facing beam is north-facing, and said beams having horizontally extending internal air flow channels extending from said south-facing beam around the perimeter of said foundation to said north-facing beam;
   a building of conventional construction erected upon said top surfaces of said preformed concrete beams, and including a floor that is spaced above the surface of the earth enclosed by said beams;
   the floor of said building, the inner side surfaces of said horizontally extending preformed beams forming said enclosed perimeter, and the surface of the earth enclosed by said perimeter defining an enclosed plenum chamber for containing heated air;
   solar collector means mounted upon said south-facing preformed concrete beam, and designed and arranged to heat air flowing therethrough;
   port means connecting said solar collector means with said horizontally extending internal air flow channels, whereby air heated by said solar collector means can flow into said air flow channels and will be effective to heat the inner side surfaces of said preformed concrete perimeter beams;
   return duct means disposed to extend across said plenum chamber from said north-facing beam to said south-facing beam, and connected between the internal air flow channel of said north-facing beam and said solar collector means, said return duct means being effective for returning air from said north-facing beam to said collector means, and the wall of said duct means functioning to transfer heat from heated air flowing therethrough to air contained within said enclosed plenum chamber; and
   blower means connected with said internal air flow channels, and adapted to assure the movement of air through said channels, said duct means and said solar collector means;
   whereby air contained within said enclosed plenum chamber is heated by radiation from said inner side walls of said preformed concrete perimeter beams and the wall of said duct means, and is available to heat said building erected upon said beams.

2. A foundation-based solar heating system as recited in claim 1, wherein said internal air flow channels of said beams define, together with said return duct means, two separate flow loops, one for each end of said enclosed perimeter, and both of said loops having solar collector means connected thereto.

3. A foundation-based solar heating system as recited in claim 1, wherein the outer side surfaces of said beams are insulated to minimize the loss of heat therefrom, and the inner side surfaces thereof are uninsulated and are exposed to said enclosed plenum chamber.

4. A foundation-based solar heating system as recited in claim 1, wherein said plenum chamber includes a heat storage bed formed of stones disposed upon the surface of the earth, said return duct means being buried in said stones.

5. A foundation-based solar heating system as recited in claim 4, including additionally a layer of waterproof sheeting laid beneath said stones comprising said heat storage bed.

6. A foundation-based solar heating system as recited in claim 1, wherein said return duct means is corrugated, to assure maximum heat transfer therefrom.

7. A foundation-based solar heating system as recited in claim 1, including additionally:
   means for establishing a circulating air flow from said plenum chamber to the interior of said building, including register means in said floor for communicating said plenum chamber with the building interior.

8. A foundation-based solar heating system as recited in claim 7, wherein said means for establishing a circulating air flow further includes an air circulating unit arranged and operable to effect a forced circulation of air.

9. A foundation-based solar heating system as recited in claim 8, wherein said air circulating unit further includes heating element means, for supplying supplemental heat to said building.

* * * * *